Aug. 15, 1967  W. GRUBER  3,335,779

TIRE REPAIR BODY

Filed Oct. 15, 1965

United States Patent Office 3,335,779
Patented Aug. 15, 1967

3,335,779
TIRE REPAIR BODY
Wilhelm Gruber, Munich, Germany, assignor to
Stahlgruber Otto Gruber & Co.
Filed Oct. 15, 1965, Ser. No. 496,371
Claims priority, application Germany, July 17, 1965,
St 24,154
18 Claims. (Cl. 152—370)

This invention relates to a repair body for motor vehicle tires, and more particularly to such a repair body which is inserted in the injury.

It is known to repair rip or hole shaped damaged spots in motor vehicle tires by plugging up the hole with a stopper of vulcanized rubber. The stopper is inserted with the aid of an awl, fork or similar tool along the axis of the damaged spot. For this purpose, the rubber stopper per se or the wall of the rip or hole passage is made slippery by a rubber solution. After the cylindrical, vulcanized repair body or stopper which usually is round in cross-section, is pulled into the tire hole, a considerable piece of the stopper extends into the interior of the tire. The stopper should then act as a seal by its more or less severe compression at the hole outlet at the tire tread so that no compressed air can escape from the tire.

However, a disadvantage in the above method results in that the long portion of the repair stopper extending into the interior enlarges the inner hole outlet by rotary movements, whereby the compressed air enclosed in the tire reaches into the damaged spot. This compressed air separates the tissue layer of the casing structure, since it cannot escape because of the seal at the hole outlet at the exterior of the tire.

According to another process, a tubular shaped hollow body with a tip mounted at one side is pressed into the rip or injury to be repaired, by means of a metal pin inserted into the hollow body, and subsequently the metal pin is again pulled out. This method of repair however cannot plug up, and therefore cannot seal, hole or rip shaped damages in tubeless tires.

Other known processes use rubber cords or rubberized and unrubberized cords or cotton threads which are pulled into the damaged spot in the shape of a bundle. Even this method of repairing, however, has not given satisfactory results, because it cannot guarantee that the individual cords would form a compact, tight and sealed mass, with the resulting disadvantages of the possibility of the escaping of air and/or of the penetration of dirt and foreign substances from without. By using cord threads or vulcanized rubber threads, it must be realized that they divert compressed air into the casing, in the absence of a protective rubberized covering. Since the casing had already become softened by wetting with a rubber solution in the insertion of the rubberized threads, the casing is so stripped that the exposed threads extend into the tire interior. Moreover, in places where the threads are cut off at the outer surface of the tire for the achievement of a surface flush with the thread, the threads tend to absorb moisture and to a certain extent transmit it like a wick into the tire interior. In the course of time, first the tread portion and then the rubber portion of the repair threads and the surrounding area of the tire become decomposed.

I have heretofore suggested a number of processes and repair substances and introduced them to the practice according to which a repair body consisting of a slightly conical, cylindrical stem opening out into an umbrella-shaped tip is inserted into a roughened hole. The hole is calibrated to correspond to the size of the repair body and made clean by means of a cleaning device. When inserting the repair body, covered with an unvulcanized but vulcanizable rubber layer, a vulcanizing paste containing a catalyst is pressed between the repair body and the wall of the prepared hole canal, so that with the aid of the released sulfur being diffused from the hole wall, the repair body is vulcanized together with the wall of the damaged spot. The satisfactory execution of this process, however, presupposes a conscientious carrying out of a whole line of process requirements. However, since as it is known, directions are often either not read at all or only hastily read, errors based on insufficient attention to the directions of operations cannot fail to appear.

Because of this, I have developed a simpler process, described in U.S. Patent 3,172,446, according to which a lamellar repair body of rectangular cross-section is used, which, folded in half, after being dipped into a vulcanizing paste, is pressed into the damaged place by means of an awl or the like in such a manner that each half of the repair body lies against the stem of the awl. In this insertion operation the repair body is stretched, and moreover the rubber material comes together so far that is is tightly pressed around the awl, so that not too great a volume must be pressed through the hole canal of the damaged spot. By pulling out the awl, the stretching of the repair body is terminated and, by the shrinkage pressure of the repair body, an increase in volume is achieved which fills in the hole canal and forms at the hole canal outlet in the interior of the tire an approximately ball-shaped tip.

Although this process has for years been practiced generally with satisfaction both domestically and in foreign countries, it has been shown that in cases where the repair body is not set up exactly in the middle of the awl, then only the longer member of the folded body remains in the hole canal of the tire, while the shorter member slips into the interior of the tire and remains there as a long end, making rotary movements during driving with all the disadvantages described above in connection with other known methods. The result was that only half the mass of the repair body remained in the hole canal as a plug, which was insufficient to perfectly and durably seal the repaired place. In order to avoid such errors, it was necessary that the repair body set up in the insertion tool always be correctly adjusted in place before insertion into the tire injury so that it was fastened exactly in the middle. Needless to say, this requirement was not always followed, especially in hasty work, which was often carried out by untrained and inexperienced repairmen.

A frequently observed feature was that after the repair work and after the cutting off of the ends of the repair body extending over the tread surface, because of the pressure resulted by the stretching during insertion of the repair body, the surface is pulled in several millimeters into the hole canal of the repair spot. It even occurred that in larger damaged places, for instance rips of about 6 mm. and more, the repair body was completely pulled in, after the cutting off of the ends extending above the tread surface, by the stretched part set through the hole canal as a result of its elasticity, so that the repair work has to be repeated with a new repair body. In such a case it was very difficult to hold the repair body in the corresponding position, since because of repeated moisturizing of the hole canal with vulcanizing paste it became too slippery. Accordingly, it would be necessary to wait some time until the vulcanizing paste was sufficiently dry in order that the new repair body could be held in the hole canal.

A further disadvantage which occurred in the practical utilization of the above repair body consisted in that they were sometimes pulled out with the removal of the insertion tool if the rubber coating of the hole canal was too moist and was therefore slippery. The repair body was also inadvertently pulled out if the tool was not pushed in up to its stopping point on the outer surface of the tire and as a result a correspondingly large tip could not be formed to prohibit the pulling out in the interior of the tire in front of the hole outlet. The same error could occur in thick-walled tires if, as a result of too short a distance between the end of the tool and its stop, the repair body is not sufficiently stretched to be inserted with its folded end into the interior of the tire in order to assure the formation of the above-mentioned seal tip.

In overcoming these disadvantages a problem exists in that it is difficult to determine from the exterior of the tire how great the damage is in the interior. Even if on the surface of the tire only a small puncture is visible, for example, the damage in the casing and the so-called inner liner vulcanized thereon can be considerably greater. In this event, the filling in with a repair body used until now would be insufficient, and the safety is questioned also in this process as well as in similar known processes. Hence, a number of retreaders rejected this type of repair work, since with insufficient sealing of a tubeless tire, air from within can penetrate the casing and could lead to a separation of layers, which would not be detected before retreading.

An object of this invention is to provide a new type of repair body, which is designed in such a manner that in its use the previously mentioned disadvantages are avoided.

This invention emanates from a lamellar repair body of rectangular cross-section, since damages resulting from foreign bodies, e.g., nails, never appear as round holes but always as flat tears. The invention generally comprises a repair body whose shaping enables a secure setting up in an insertion tool, making corrections unnecessary, avoids a slipping in into the interior of the tire as well as pulling out with the insertion tool, and provides so much reserve elasticity that it can be inserted under stretching, and after termination of the stretching the entire wall of the hole canal as well as its outlets in the interior of the tire and on the tread surface are tightly sealed.

For solving these problems, the invention proposes a lamellar repair body of rectangular cross-section for motor vehicle tires made of rubber, which is characterized in that it includes at least one hole which increases elasticity and allows the setting in of an insertion tool. In an appropriate, improved form of execution, in addition, the body includes two sections facing each other and widening outwards.

Novel features and advantages of the present invention will become apparent to one skilled in the art from a reading of the following description in conjunction with the accompanying drawings wherein similar reference characters refer to similar parts and in which.

Figure 1:
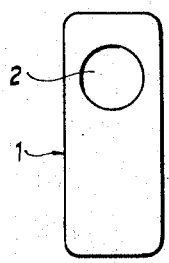
FIG. 1 is a plan view of one embodiment of this invention.

The simplest example of construction in accordance with this invention is represented in FIG. 1. According to this, the inventive repair body consists preferably of a wafer or band, generally designated with 1, of vulcanized, very elastic-remaining rubber, which can be coated in a bonded layer consisting of unvulcanized but vulcanizable rubber, but which can also consist of a vulcanized, very elastic rubber, which keeps elasticity constant, without the unvulcanized, vulcanizable bonded layer coating. Hole 2 is located in one end of body 1. The body 1 is applied by inserting an insertion tool, for example a known awl or fork in hole 2. As a result the repair body is easily slid into the injury and glides well in the fork. The edges of the hole can be rounded off or can be bevelled to facilitate the insertion of body 1. The hole 2 furthermore acts to reduce the spreading of the hole canal of the damaged spot as well as to increase elasticity of the repair body as a whole and thus to achieve a better fitting to the various damage forms. Moreover, the hole 2 effects in the interior of the tire, the formation of a tip which prevents the slippage outwards of body 1.

Figure 2:
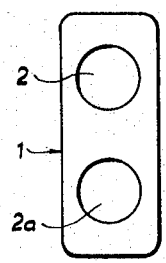
FIG. 2 is a plan view of another embodiment of this invention.

In the repair body shown in FIG. 2, there are disposed two holes 2 and 2a spaced from each other. The second hole (either 2 or 2a) can be used as a gauge for checking whether the repair body is correctly inserted in the tire injury. In this respect, after body 1 has been inserted in the injury, some of body 1 including a portion of one of the holes should remain beyond the tire tread.

Figure 3:
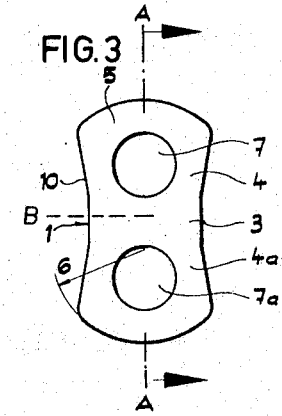
FIG. 3 is a plan view of still another embodiment of this invention.
Figure 4:
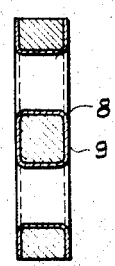
FIG. 4 is a cross-sectional view taken through FIG. 3 along the line A—A.

The further improved form of execution according to FIGS. 3 and 4 is a combination of a middle section 3 and two widening, uniform sections 4 and 4a connecting at both sides thereon to section 3. The narrow sides 5 are rounded off, e.g., in that their edges are formed along the arc having a radius 6. In the proximity of the ends there is located in each section 4 or 4a a hole 7 or 7a which is appropriately rounded off from the outside, as shown in FIG. 4 by the number 8. FIG. 4 shows also the bonded layer 9 coating the repair body. Just as in the embodiment shown in FIG. 2, the one hole serves to hold the insertion tool, for example, while the other, e.g., 7a, is used to check whether the repair body is inserted perfectly. When body 1 is properly inserted the flanks 10 of the widened section, should fit at the hole canal outlet in the interior of the tire thus giving greater certainty of securement than the corresponding sides of a more simple repair body according to FIGS. 1 and 2. The second hole 7 or 7a thus serves as a gauge to determined if flanks 10 also take this position when the repair body is pulled in the direction of the outer surface of the tire by the insertion tool.

In inserting the body into the tire, the insertion tool is hooked into one of the holes. A correction with respect to the exact center position is not necessary, since in setting in, whereby it is stretched, the body is automatically directed to the center. After the body is dipped into a vulcanizing paste, it is then pressed into the tire injury with the tool, whereby it is stretched, particularly in the area of the exerted pull, i.e., in the area where the insertion tool is set in the hole, and thereby can easily be inserted into the tire injury. However, a pressing through of the whole body into the tire does not occur, since it is prevented by the widened section which is disposed adjacent the hole and which acts as a gauge. This latter hole (e.g. 7a) is not stretched as much as the former hole (e.g., 7), but instead in a much slighter degree or even not stretched at all. The penetration of the repair body into the hole canal of the damaged spot and its stretching are also considerably less dependent on the size of the tire injury than before, since because of the tapered shape of the repair body already from the holes (e.g., 2a or 7a) or which additionally is provided in the tapered shape of sections 4 of FIG. 3, each damage according to its size (even defects up to 10 mm.) is safely filled in or overfilled, so that errors such as insufficient filling in, etc., cannot occur.

An accidental pulling out of the repair body when removing the insertion tool is additionally prevented by the fact that immediately after release of the tension brought about by the stretching, a tip is formed in the interior of the tire, since by compressing the body in the tire injury, flanks 10 directed upwards in the rest position become set horizontally or nearly horizontally and, when they reach the interior of the tire, spring back in the direction of the hole outlet and press against the tire interior near the injury with their entire cross-sectional surface.

A similar effect also sets in on the opposite side, i.e., the tread side, of the tire, where, a certain springing back of the outer section 4 also is effected in the direction of middle section 3, and which serves for the complete filling in or corresponding overfilling of the damaged spot.

Figure 5:
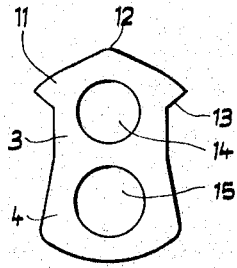
FIGS. 5–10 are plan views of further embodiments of this invention.

While the repair body, according to FIGS. 3 and 4, is constructed symmetrical to theoretical axis B shown by a dotted line, in the embodiment shown in FIG. 5, is not so constructed. Accordingly, the advantage related to the second widened section of FIG. 3 is given up. The FIG. 5 form, however, is chosen to assure with greater certainty in the firm anchoring in the hole canal of the damaged place. To the sections 4 and 3 (which correspond to the like numbered sections of FIGS. 3 and 4) tip 11 is connected. For the insertion into the damaged spot, tip 11 includes a protuberance or point rounded off at 12 and spring-back flanks 13 connected to the middle section 3. Hole 14 designed for holding the insertion tool has a somewhat smaller diameter than hole 15 in section 4 which in this case only increases elasticity, avoids spreading of the hole canal, and if necessary serves with respect to seating control. It is recognized that in this form of construction, because of the stretching caused by the insertion with a tool, the tip 11 can be particularly well inserted into the hole canal of the damaged place, and that after release of the tension flanks 13, tip 11 adheres particularly well to the inner wall of the tire next to the injury, since flank 13 would be adjusted horizontally or even beyond the horizontal by the spring action.

Figure 6:
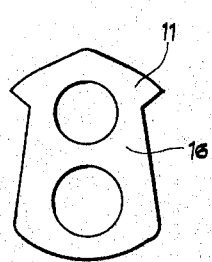

The embodiment shown in FIG. 6 differs from that of FIG. 5 in that the middle section is eliminated, and replaced by a uniformly widened out section 16, which is rounded off at the ends, and is directly connected to tip 11.

Figure 7:
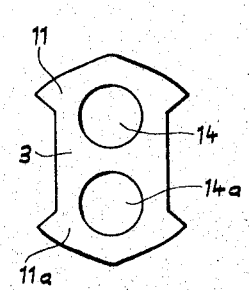

The modified arrangement according to FIG. 7 is somewhat similar to that of FIG. 3. In FIG. 7 the repair body has a pair of tips 11 and 11a each with a hole 14 and 14a interconnected by section 3.

Figure 8:
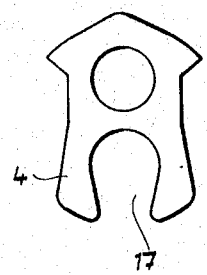

A still further modified arrangement is shown in FIG. 8 which essentially reproduces the form of FIG. 5, but here instead of a hole, slot 17 open on one side is shown in section 4, whereby the elasticity of the repair body in this section and the prevention of an exaggerated spreading of the hole canal are increased even more. Furthermore, an insertion tool cannot be set into this opening, so that the correct use of the repair body is assured.

Figure 9:
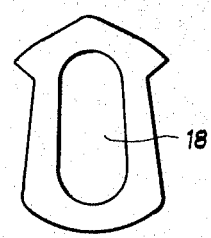

In the event that the above-mentioned advantage with respect to FIG. 8 is not considered pertinent, a construction form as shown in FIG. 6 can be altered as indicated in FIG. 9 in that both holes are combined to one slit 18.

Figure 10:
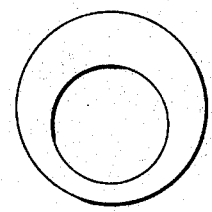

Moreover, the form of FIG. 2 can similarly be changed to a shape according to FIG. 10 in which the circular body has a single eccentric hole.

The repair bodies of the invention are suited excellently to bring into play the advantages of a multi-layered construction, according to which the body is built up of jointly alternating and mutually connected layers of unvulcanized and vulcanized rubber in a manner that only the outer layers after insertion into the damaged spot are vulcanized for connection with the wall of the hole canal, while the inner layers of unvulcanized rubber situated next to the elastic layers of vulcanized rubber, remain unvulcanized and therefore plastic.

Obviously, many modifications and variations of the present invention are possible in the light of the above teachings. It is, therefore, to be understood that within the scope of the appended claims the invention may be practiced otherwise than as specifically described.

What is claimed is:

1. A tire repair body comprising an elastic wafer of rectangular cross-section, and a hole completely through said wafer for increasing its elasticity thereof and for permitting a repair member to be applied therein.

2. A repair body as set forth in claim 1 wherein said wafer is substantially rectangular in its plan view, and said hole being in one end of said wafer.

3. A repair body as set forth in claim 2 wherein a second hole is in the other end of said wafer.

4. A repair body as set forth in claim 1 wherein said wafer is relatively narrow in width at its central portion and widens outwardly towards its ends.

5. A repair body as set forth in claim 4 wherein the sides of each end of said wafer diverge symmetrically and are connected to each other by an arcuate portion, and said central portion being of a constant width.

6. A repair body as set forth in claim 5 wherein said hole is provided in one of said ends of said wafer, and a second hole being provided in the other end of said wafer.

7. A repair body as set forth in claim 4 wherein one of said ends is arcuate having an outwardly extending protuberance, and a pair of outwardly extending flanks connecting said one end to said central portion.

8. A repair body as set forth in claim 7 wherein said hole is in said arcuate end of said wafer, and a second hole being in the other end of said wafer.

9. A repair body as set forth in claim 8 wherein said other end of said wafer is also arcuate having an outwardly extending protuberance, and a second pair of outwardly extending flanks connecting said other end to said central portion.

10. A repair body as set forth in claim 7 wherein the sides of said wafer diverge symmetrically from said flanks to the tip of the other end of said wafer.

11. A repair body as set forth in claim 4 wherein said hole is in one of said ends of said wafer to accommodate the insertion member, a second hole being in the other of said ends of said wafer, and said second hole being larger than the first hole for increasing the elasticity of said wafer and for avoiding enlarging the tire injury.

12. A repair body as set forth in claim 4 wherein said hole is in one of said ends of said wafer and an exposed slit being in the other of said ends of said wafer.

13. A repair body as set forth in claim 4 wherein said hole extends completely across said central portion and into each of said ends.

14. A repair body as set forth in claim 1 wherein said wafer is formed of alternate layers of vulcanized and unvulcanized rubber, with the outermost exposed layers being vulcanized.

15. A repair body as set forth in claim 1 wherein said wafer is circular in its plan view with a single eccentric hole comprising said hole for accommodating an insertion member.

16. A repair body as set forth in claim 1 wherein said hole is in one end of said wafer to accommodate the insertion member, and a second hole being in the other end of said wafer, said second hole being larger than the first hole for increasing the elasticity of said wafer and for avoiding enlarging the tire injury.

17. In combination with a vehicle tire having an injury extending from the exposed surface to the tire interior, an elastic repair body, said repair body being rectangular in cross-section, said body being relatively narrow in width at its central portion and widening outwardly toward its ends, a hole in one of the ends of said body, said body being inserted in said injury with its hole end innermost, the widened portion at said hole end extending beyond said injury to form a tip which abuts against said tire interior adjacent said injury, and the other widened end preventing said entire body from being inserted in said injury.

18. The combination of claim 17 wherein a second hole is in said other widened end of said body, and at least a portion of said hole projecting beyond said exposed surface of said tire.

References Cited

UNITED STATES PATENTS

| | | | |
|---|---|---|---|
| 3,095,342 | 6/1963 | Kraly | 152—370 |
| 3,172,446 | 3/1965 | Gruber | 152—370 |

ARTHUR L. LA POINT, *Primary Examiner.*

R. A. BERTSCH, *Assistant Examiner.*